United States Patent [19]

Harrell

[11] Patent Number: 5,228,749
[45] Date of Patent: Jul. 20, 1993

[54] PIVOTING HEADREST HAVING SNAP-TOGETHER BODY SECTIONS

[75] Inventor: David J. Harrell, Royal Oak, Mich.

[73] Assignee: Lear Seating Corporation, Southfield, Mich.

[21] Appl. No.: 918,442

[22] Filed: Jul. 22, 1992

[51] Int. Cl.$^5$ .............................................. A47C 1/10
[52] U.S. Cl. ..................................... 297/408; 297/391
[58] Field of Search ............... 297/408, 409, 396, 391, 297/397, 404, 408; 74/540

[56] References Cited

U.S. PATENT DOCUMENTS

| | | |
|---|---|---|
| 2,828,810 | 4/1958 | Barecki et al. |
| 4,191,423 | 3/1980 | Goldner ............................. 297/408 |
| 4,370,898 | 2/1983 | Maruyama . |
| 4,558,903 | 12/1985 | Takagi . |
| 4,619,725 | 10/1986 | Muraishi et al. |
| 4,640,549 | 2/1987 | Yokota . |
| 4,673,214 | 6/1987 | Meiller ............................... 297/408 |
| 4,674,792 | 6/1987 | Tamura et al. |
| 4,674,797 | 6/1987 | Tateyama . |
| 4,678,232 | 7/1987 | Ishida et al. |
| 4,733,913 | 3/1988 | Tateyama . |
| 4,830,434 | 5/1989 | Ishida et al. |
| 4,858,994 | 8/1989 | Yamashita . |
| 5,052,754 | 10/1991 | Chinomi . |

FOREIGN PATENT DOCUMENTS

| | | | |
|---|---|---|---|
| 2734506 | 2/1979 | Fed. Rep. of Germany | 297/408 |
| 2902246 | 7/1980 | Fed. Rep. of Germany | 297/408 |
| 3021122 | 12/1981 | Fed. Rep. of Germany | 297/408 |

Primary Examiner—Laurie K. Crammer
Attorney, Agent, or Firm—Reising, Ethington, Barnard, Perry & Milton

[57] ABSTRACT

A pivoting headreast assembly (10) has a headrest body (12) pivotally mounted to a mounting post (14). The headrest body (12) is hollow and houses a ratchet mechanism (104) for controlling the angular positioning of the headrest body (12). The headrest body (12) has an upper shell section (30) and a lower base section (32) provided with snap-lock couplings (50, 52) for enabling the sections (30, 32) to be snapped into engagement with one another.

6 Claims, 5 Drawing Sheets

PIVOTING HEADREST HAVING SNAP-TOGETHER BODY SECTIONS

TECHNICAL FIELD

The invention relates to a headrest assembly for automotive seats and more particularly to the construction of pivotable headrests.

BACKGROUND OF THE INVENTION

Various headrest assemblies are known to the art in which a headrest body of the assembly is pivotably mounted to a support post. The body of such assemblies is usually hollow and houses a pivoting mechanism therein.

One example of such a headrest assembly is disclosed in the U.S. Pat. No. 4,858,994 to Yamashita, granted Aug. 22, 1989. This patent teaches forming the body of the headrest in two sections which are welded together to join the sections and capture the mounting post and pivoting mechanism therebetween. Welding the body sections together, however, is undesirable in that it requires costly welding equipment and adds an additional step to the manufacture of the headrest.

SUMMARY OF THE INVENTION AND ADVANTAGES

A tilt-adjustable headrest assembly comprises mounting post means, a headrest body having a first and second body sections, pivot connection means for pivotally connecting the body sections to the mounting post means enabling the headrest body to pivot relative to the mounting post means, and is characterized by the body sections having self-locking snap-together coupling means for automatically locking the first body section into retaining engagement with the second body section upon application of a compressive assembly force to the body sections.

The invention advantageously provides a self-locking feature to the body sections enabling them to be snap locked into retaining engagement with one another without the need for special tools or equipment. This self-locking feature also simplifies the manufacture of headrest assemblies at a reduced cost.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
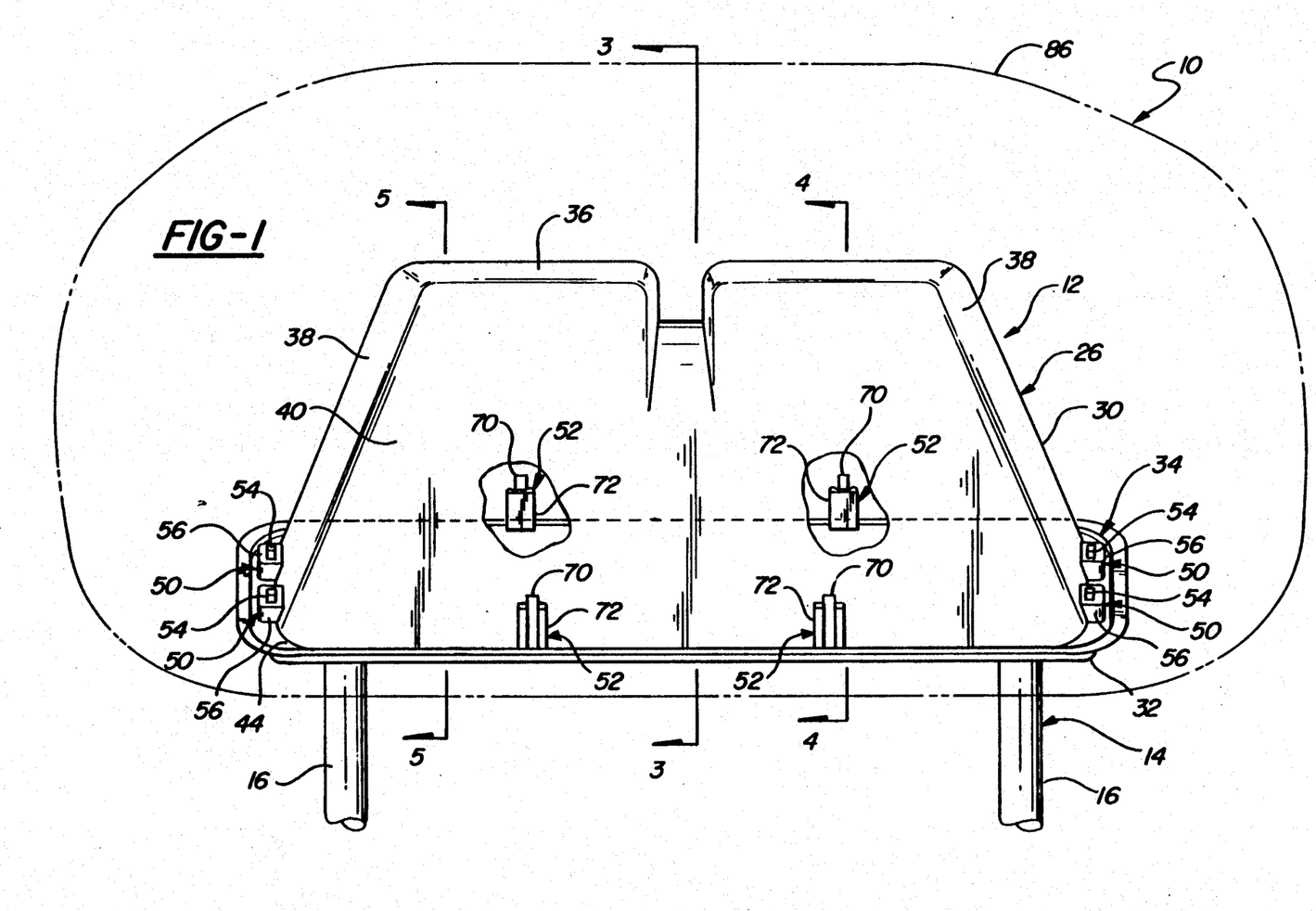
FIG. 1 is a front view of a preferred embodiment of the invention shown partially broken away and with the headrest body tilted forwardly.

An adjustable headrest assembly constructed according to a presently preferred embodiment of the invention is generally shown at 10 in FIG. 1 and includes a headrest body 12 mounted to mounting post means (or mounting post) 14 for attachment to a seat (not shown).

The mounting post means 14 is a generally U-shaped support having a pair of spaced apart and parallel extending legs 16 integrally joined at their upper ends by a generally horizontal transverse cross member portion 18. The mounting post 14 is constructed from a single piece of cylindrical metal rod having a generally circular cross section which has been bent into the U-shape to form the legs 16 and cross member 18. The legs 16 are formed on their rearward side with a plurality of notches 20 which are designed to engage a vertical adjustment mechanism (not shown) of the seat in known manner. The cross member 18 is formed with a central flattened region 22 located approximately midway between the legs 16 and presenting a pair of parallel flats 24 which are offset or angled with respect to the legs 16 (FIG. 3) for reasons described below. The flattened region 22 is formed during a coining operation and preferably prior to bending the post 14 into its U-shape.

The headrest body 12 is comprised of a hollow elongate core 26 extending horizontally along the cross member 18 and fabricated of rigid organic polymeric material defining a cavity 28 within the headrest body 12. The core 26 includes separate and distinct upper and lower first and second body sections 30, 32 having self-locking snap-together coupling means 34 for automatically locking the first body section 30 into retaining engagement with the second body section 32 upon application of a compressive assembly force applied to the body sections 30, 32 to force them into engagement with one another and to capture the horizontal portion 18 of mounting posts 14 between the sections 30, 32.

Figure 2:
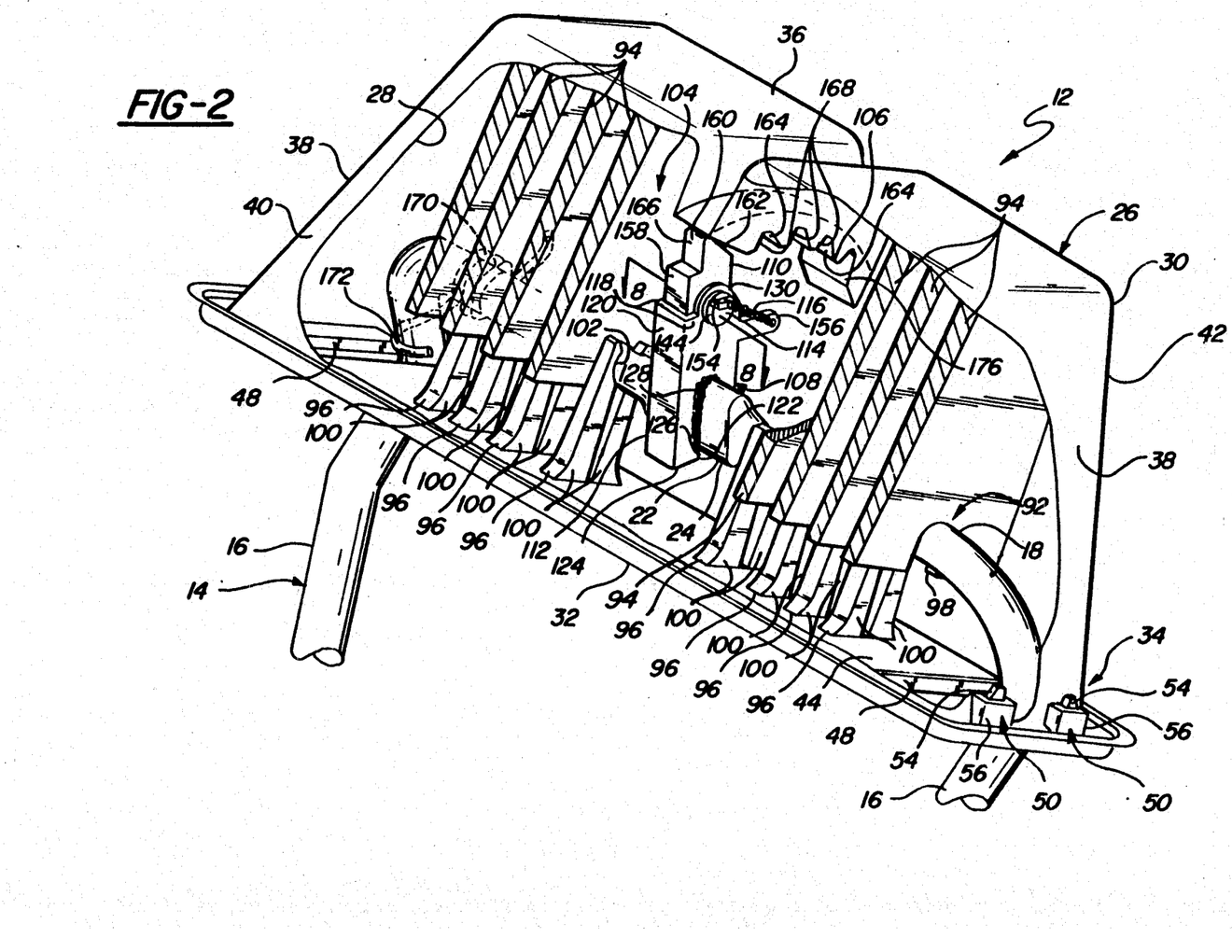
FIG. 2 is a perspective view of the invention shown partially broken away.

The upper section 30 is formed as a hollow shell or cover member and has a top wall 36, a pair of side wall portions 38, and front and rear wall portions 40, 42. The cover 30 is open at the bottom. The lower section 32 is formed as a generally planar base member having an upper surface 44 engaging the extended free ends of the side wall portions 38 and front and rear wall portions 40, 42 to close the cavity 28. The base section 32 also has a lower surface 36 defining an underside of the headrest body 12. As shown in FIG. 2, the base section 32 has a pair of slot-like elongate openings 48 through which the legs 16 extend out of the cavity 28.

The self-locking snap-together coupling means 34 comprises mutually engagable female and male members formed as integral portions of the body sections 30, 32. As shown best in FIG. 1, the mutually engagable portions comprise a pair of left and right snap couplings 50, shown in detail in FIG. 7, and a pair of front and rear snap couplings 52, shown in detail in FIG. 8, both of which are external to the headrest cavity 28. Each of the left and right couplings 50 includes flexible male spring finger latch 54 formed integrally with the lower section 32 and extending upwardly therefrom for snap-together locking engagement with a female boss or catch 56 formed integrally on the left and right side wall portions 38 of the upper body section 30. As shown best in FIG. 7, the spring finger latch 54 includes an upstanding shank 58 extending from the upper surface 44 of the base 32 and terminating with an enlarged locking head 60. Each head 60 is formed with a camming surface 62 and a locking shoulder 64. The catches 56 extend outwardly of the left and right side wall portions 38 of the upper section 30 and have generally vertical passageways or channels 66 extending therethrough for insertably accommodating the spring finger latches 54. The catches 56 also include a locking shoulder 68 adjacent the channel 66 for lockably engaging the locking shoulder 64 of the enlarged head 60 when assembled. Upon forcing the upper section 30 into engagement with the lower section 32, the cam surface 62 engages the walls of the channel 66 and causes the spring finger 54 to elastically deflect enabling the enlarged head 60 to enter the channel 66. Once the head 60 passes through the channel 66, the elasticity of the spring finger latch 54 causes the latch 54 to return to its undeflected condition and the locking shoulder 64 of the latch 54 to lockingly engage the shoulder 68 of the catch 56, as shown in FIG. 9.

The front and rear snap couplings 52 (FIG. 10) are similarly constructed and include an elastic male spring finger latch 70 extending up from the lower body section 32 and engaging corresponding catches or bosses 72 formed integrally with and extending outwardly of the front and rear wall portions 40, 42 of the upper body section 30. The latches 70 each have a similar shank portions 74 and enlarged locking heads 76 formed with a camming surface 78 and locking shoulder 80. The catch 72, however, has an open U-shaped passageway or channel 82 for guiding the locking shoulder 80 of the spring finger latch 70 into snap-together engagement with a corresponding upper surface locking shoulder 84 of the catch 72. As shown in FIG. 1, the front pair of snap couplings 52 are offset in spacing slightly from the rear pair of snap couplings to assure that the upper section 30 can be connected to the lower section 32 in one way only. The front and rear snap couplings 52 operate in all other respects identically to the left and right snap couplings 50.

Figures 3, 9:
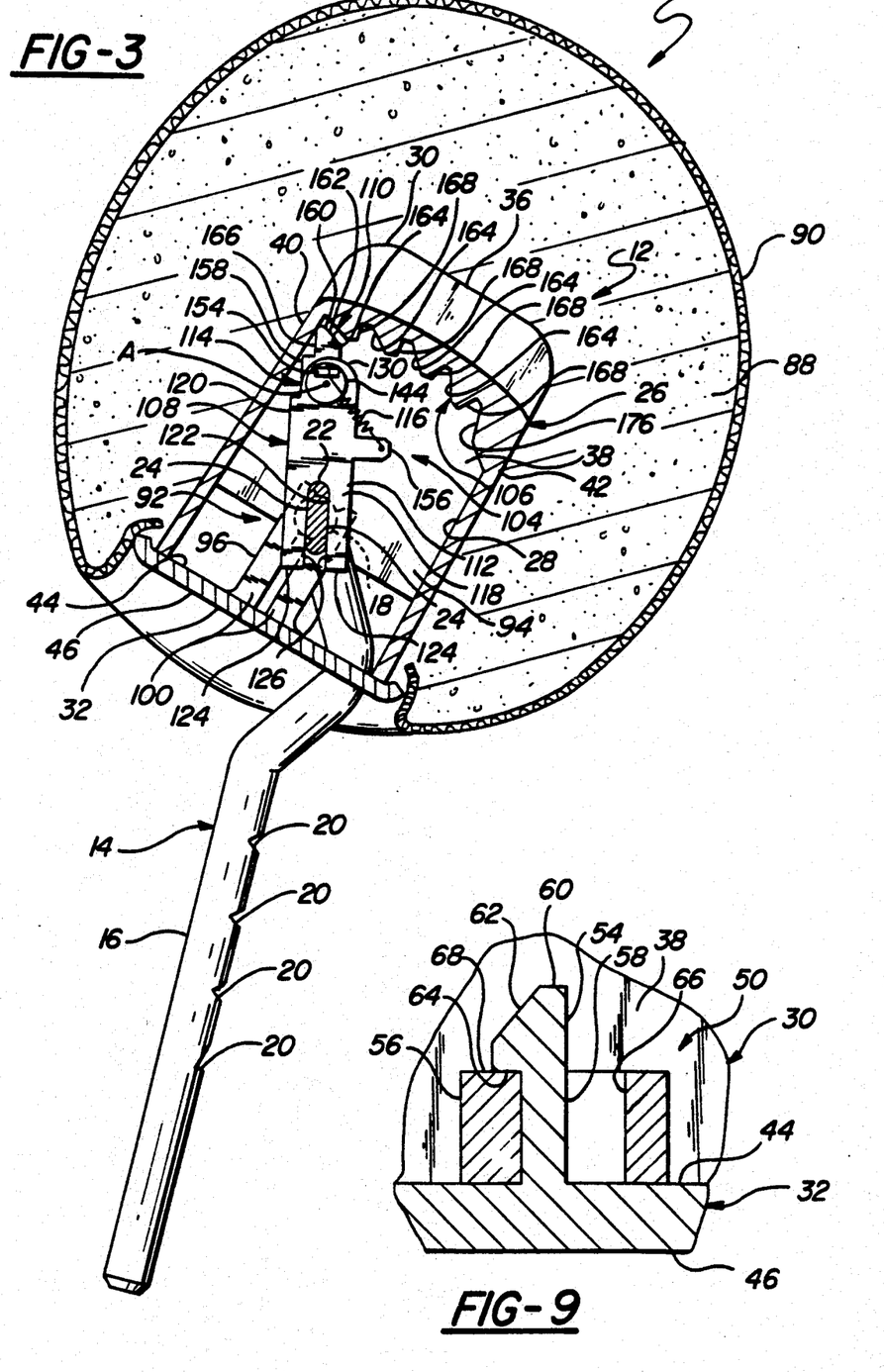
FIG. 3 is a cross-sectional view taken along lines 3—3 of FIG. 1 but showing the headrest body tilted rearwardly.
FIG. 9 is an enlarged fragmentary cross-sectional view of the side snap-coupling joining the headrest shell to the base.

A headrest cushion 86 is disposed about the headrest core or body 26 for comfort and comprises a layer of foam 88 and an overlying decorative cover 90 disposed about the outer surface of the upper section 30 and extending beyond the lower section 32 as shown in FIG. 3. In this manner, the under-side 46 of the head rest body 12 is concealed but not covered by the headrest cushion 86. The headrest cushion 86 is preferably disposed about the core 26 using foam-in-place technology in which the foam 86 is introduced in liquid form between the cover 90 and core 26 and then cured to assume the desirable headrest shape. The headrest cushion 86 is devoid of any foam 88 in the region of the snap couplings 50, 52 to ensure their proper functioning.

Figures 4, 5, 10:
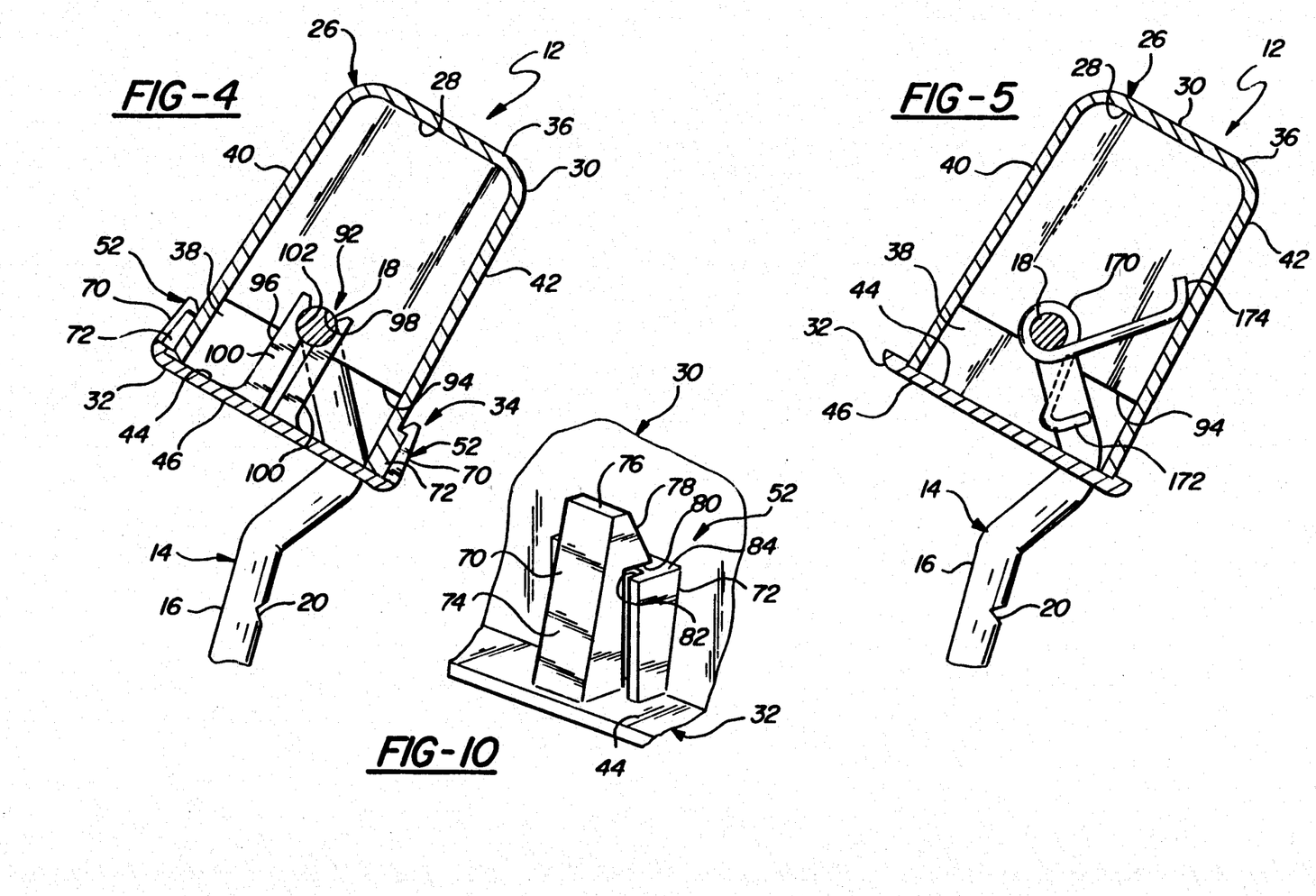
FIG. 4 is a cross-sectional view taken along lines 4—4 of FIG. 1 but showing the headrest body tilted rearwardly.
FIG. 5 is a cross-sectional view taken along lines 5—5 of FIG. 1 but showing the headrest body tilted rearwardly.
FIG. 10 is an enlarged fragmentary perspective view of the front and rear snap couplings.

Referring now to FIGS. 2 and 4, the headrest assembly 10 further includes pivot connection means 92 formed integrally with the upper and lower sections 30, 32 for directly pivotally connecting the headrest body 12 to the mounting post 14 to enable the headrest body 12 to pivot relative thereto in either a forwardly or rearwardly direction. The pivot connection means 92 comprises a plurality of interlocked rear and lower saddle portions 94, 96 formed integrally with the upper and lower core sections 30, 32, respectfully, and extending into the headrest cavity 28 and straddling the horizontal cross member 18 on opposite sides thereof to pivotally couple the sections 30, 32 of the headrest body 12 to the mounting post 14. The upper saddle portions 94 extend between the front 40 and rear 42 walls of the upper section 30, as best illustrated in FIG. 4, bridging the walls 40, 42 and providing structural rigidity (i.e., crush strength) to the headrest body 12.

The extended free ends of the upper saddles 94 are each provided with a generally semicircular U-shaped recess 98 for receiving the cross member 18 within the recesses 98 with a portion of the saddles 94 extending beyond the cross member 18 (i.e. straddling) as shown best in FIGS. 2 and 4. The saddles 96 of the lower section 32 each include self-locking snap-on retaining means for engaging and retaining the cross member 18 attached to the lower section 32. The retaining means comprises a pair of flexible spring arms 100 which are spaced from one another and define a socket 102 therebetween. The opening into the socket 102 is smaller than the diameter of the cross member 18. However, forcing the arms 100 against the cross member 18 causes the arms 100 to deflect away from one another and widens the access into the socket 102 sufficiently to receive and retain the cross member 18 within the socket 102 as shown in FIG. 4. As such, the spring arms 100 provide a snap-lock coupling to the lower ribs 96. Like the upper saddles 94, the arms 100 of the lower saddles 96 extend beyond the cross member 18 so as to overlap the upper saddles 94.

The assembly 10 also includes ratcheting means 104 disposed within the cavity 28 about half way between the left and right side ends 38 and acting between the mounting post 14 and the headrest body 12 for permitting the headrest body 12 to pivot forwardly relative to the mounting post 14 while selectively locking the headrest body 12 against rearward pivotal movement.

Figures 6, 7, 8:
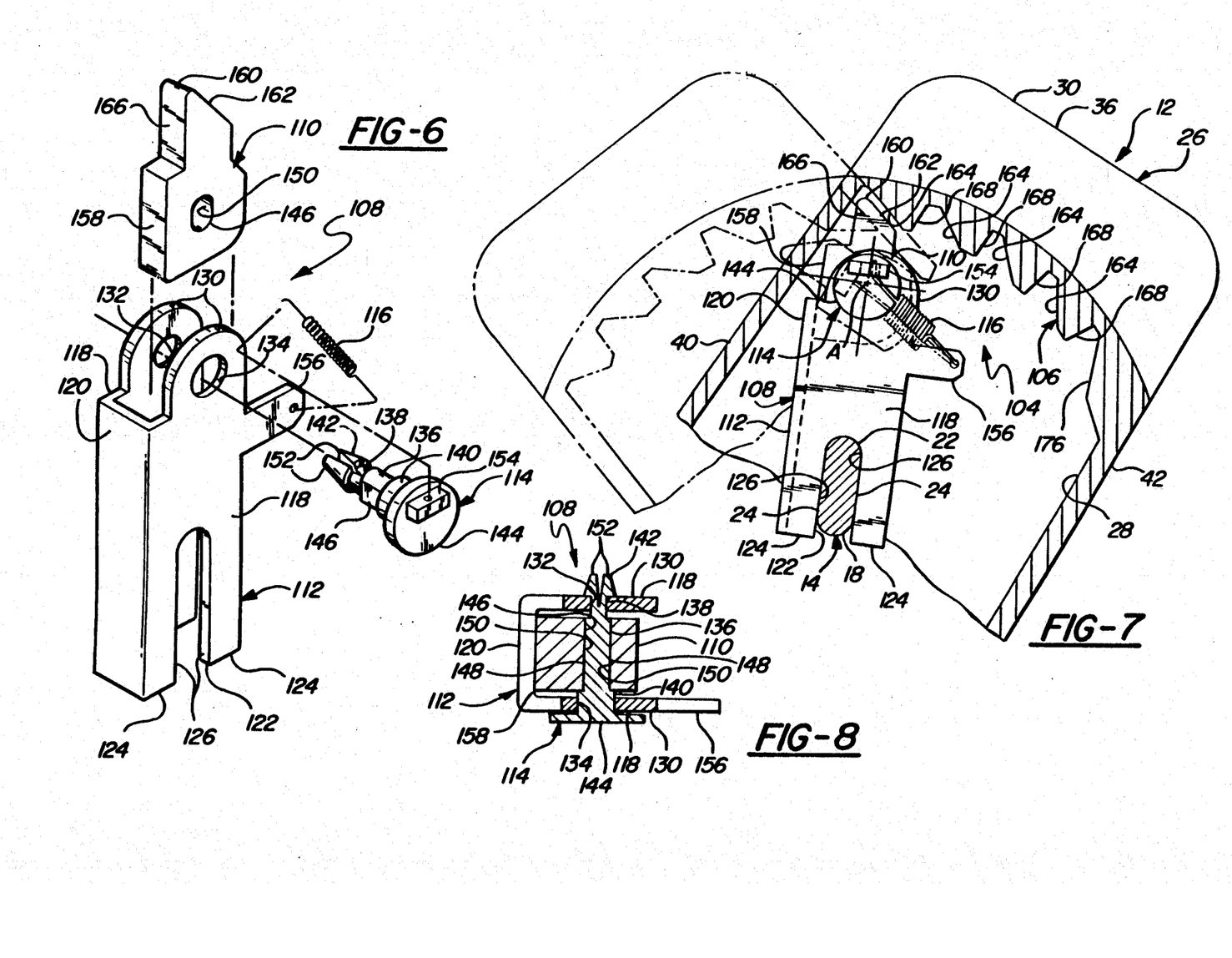
FIG. 6 is an exploded perspective view of a preferred detent mechanism of the present invention.
FIG. 7 is an enlarged fragmentary cross sectional view showing the headrest body tilted between two positions of angular adjustment.
FIG. 8 is a cross-sectional view taken along lines 8—8 of FIG. 2.

The ratcheting means 104 comprises a rack 106 having a plurality of directional one-way ratchet teeth formed as an integral portion of the upper section 30. In other words, the rack 106 is formed of the same material and the upper section 30 As shown in FIGS. 3 and 7, the rack 106 extends between the front 40 and rear 42 walls with the teeth of the ratchet 106 lying along an arcuate path and centered about the central axis of the cross member 18. The rack 106 is recessed into the top wall 36 (FIGS. 2, 3 and 7) and lies approximately midway between the side walls 38 so as to be aligned with the flattened region 22 of the cross member 18.

The ratcheting means 104 further includes a ratchet device 108 mounted to the cross member 18 of the mounting post 14 for engaging the rack teeth 106 to control the angular positioning of the headrest body 12. The ratchet device 108 comprises a pawl member 110 and a pawl carrying support member or support arm 112. The pawl member 110 is pivotally coupled to the support arm 112 by a pivoting means or pivot pin 114 and is spring biased into operational engagement with the ratchet teeth of the ratchet 106 by an extension spring 116 extending between the pivot pin 114 and support arm 112. As illustrated best in FIG. 6, the support arm 112 has a generally U-shape when viewed on end and includes a pair of spaced apart and generally parallel side wall portions 118 and a transverse connecting wall portion 120 extending between and connecting the side wall portions 119. The pawl 110 is disposed between and pivoted to each of the side wall portions 118. The support arm 112 is preferably formed from a single piece of sheet steel which has been stamped and bent to establish the side wall and connecting wall portions 118 120.

The ratchet device 108 and cross member 18 include self-aligning angular locating means acting between the support arm 112 and the cross member 18 for positively locating the ratchet 108 on the cross member 18 with a predetermined angular orientation relative to a central linear axis of the mounting post legs 16. This angular relationship is best shown in FIG. 3 wherein the support arm 112 is angled approximately 10° forwardly of the central axis of the mounting post legs 16. The specific angular relationship, however, may vary depending upon the application. The angular locating means comprises the central flattened region 22 of the cross member 18 in combination with a pair of aligned slots 122 formed in the side wall portions 118 of the support arm 112. Each of the side wall portions 118 includes a pair of spaced legs 124 defining the aligned slots 122 and presenting facing engaging surfaces 126 which are spaced substantially the same distance apart as the flats 24 of the flattened region 22. The aligned slots 122 enable the flattened region 22 of the cross member 18 to be received into the slots 122 such that the fingers 124 straddle the flattened region 22 and the engaging surfaces 126 of the fingers 124 intimately contact the flats 24 as shown best in FIGS. 3 and 7. The cooperation between the flattened region 22 and the slots 122 serves to self-orient the support arm 112 in its proper angular relationship with respect to the mounting post legs 16. In other words, the straddling engagement of the fingers 124 of the flattened region prevents the support arm 112 from rotating on the mounting post 14 and thereby establishes and maintains the desired angular position. Once properly positioned, the support arm 112 is secured to the cross member 18 by a weld 128 or other suitable fastening means.

As shown in FIG. 2, the ratchet device 108 is located approximately midway between the mounting post legs 16 aligned with the rack 106. Centrally locating the ratcheting means 104 places it more directly along the line of force expected to be applied to the headrest body 12 during angular adjustment of the body 12 or by a user's head as a result of a rear end collision. In either case, force is likely to be applied centrally to the headrest body approximately midway between the mounting post legs 16. Positioning the ratcheting means 104 directly along the line of applied force minimizes torsion.

The side wall portions 118 of the support arm 112 include upstanding ears 130 extending above the connecting wall 120 and having annular bearing surfaces 132, 134 defining a corresponding pair of aligned apertures 132, 134 extending through the side wall portions 118. As illustrated in FIGS. 6 and 8, the aperture 134 is larger in size than the aperture 132, for reasons to be explained below.

The pivot pin 114 is includes a shaft-like main body having a central pawl-engaging portion 136, first and second journaling portions 138, 140 disposed on opposite sides of the central portion 136, and a pair of first and second enlarged retaining heads 142, 144 formed at opposite ends of the pivot pin 114 adjacent the respective first and second journaling portions 138, 140. The pivot pin 114 extends completely through the apertures 132, 134 of the support arm 112 and through a keyed passage or hole 146 of the pawl 110 with the enlarged heads 142, 144 engaging the outer surface of the respective side wall portions 118 to retain the pivot pin 114 and pawl 110 connected pivotally to the support arm 112. The journaling portions 138, 140 of the pivot pin 114 are rotatably supported by annular bearing surfaces 132, 134 so as to enable the pawl member 110 and pivot pin 114 to pivot as a unit about an axis A of the pivot pin 114 relative to the support arm 112. The central pawl-engaging portion 136 and the passage 146 have cooperating abutment surfaces 148, 150, respectively, which are engaged with one another to prevent the pawl 110 from rotating on the pivot pin 114. In the preferred embodiment, the abutment surfaces 148, 150 are formed as cooperating pairs of flat surfaces on the central pawl engaging portion 136 and on the walls of the passage 146. The central pawl engaging portion 136 and passage 146 are shown as having a generally rectangular cross-sectional mating configuration, but it will be appreciated that other configurations would be suitable to prevent rotation between the pawl 110 and pivot pin 114.

As best illustrated in FIG. 8, the first head portion 142 includes self-locking fastening means for automatically locking the pivot pin 114 into retaining engagement with the support 12 upon application of a push-together assembly force to the pivot pin 114 and support 112. The fastening means comprises a pair of flexible spring fingers or tangs 152 separated by a V-shaped groove which enables the head 142 to flex inwardly of itself in response to forcing the head 142 into the aperture 132 so as to assume a smaller diametrical size allowing the head 142 to pass through the smaller aperture 132, after which the tangs 152 are able to return to their nondeflected condition to engage the outer peripheral edge of the smaller aperture and retain the pivot pin 114 connected to the support arm 112. The snap-lock head 142 is also sized to enable it to be inserted first through the larger aperture 134, then through the passageway 146 of the pawl, and finally through the smaller aperture 132 for snap-together engagement with the support 112.

The larger head 144 is formed with a spring attachment portion 154 spaced from the pivot pin axis A. The associated side wall 118 is similarly formed with a projecting spring attachment tab 156. The aforementioned extension spring 116 is connected at one end to the spring attachment portion 154 and at the other end to the tab 156. The spring 116 normally acts to bias the pawl 110 clockwise, as viewed in FIG. 7, so that a stopping portion 158 of the pawl 110, which is spaced from the pivot axis A of the pivot pin 114, engages the inner surface of the connecting wall 120 to limit its clockwise travel, as shown in solid lines in FIG. 7. In this position, a single tooth rack engaging portion 160 of the pawl 110 is in an upright position and operatively engaging the teeth of the rack 106. The rack engaging portion 160 includes an inclined camming surface 162 facing rearwardly of the headrest assembly 10 for cooperating with inclined camming surfaces 164 of the rack teeth 106. The camming surfaces 162, 164 cooperate to enable the headrest body 112 to pivot forwardly in the direction of arrow F in FIG. 7. The rack engaging portion 160 further includes a locking surface 166 facing forwardly which cooperates with corresponding rearwardly facing locking surfaces 168 of the ratchet 106 to prevent the headrest body from pivoting rearwardly in the direction of arrow R in FIG. 7.

Biasing means, and preferably a helical torsion spring 170, is accommodated on the cross member 18 of the mounting post 14, as shown in FIG. 5, and has one end of the spring 172 engaging and reacting against one of the mounting post legs 16 and the opposite end of the spring 174 slidingly engaging the inner surface of the rear wall portion 42 of the head rest core 26 to continuously urge the headrest body 12 in the rearward pivoting direction R to cause the locking surface 166 of the pawl to engage one of the locking surfaces 168 of the rack teeth 106 to retain the headrest body 12 in a selected position of angular adjustment. As shown in FIGS. 2 and 5, the torsion spring 170 lies between adjacent upper saddles 94 to limit lateral movement of the torsion spring on the cross member 18.

To construct the headrest assembly 10, the mounting post 14 is coined to form the central flattened region 22 and then bent into the U-shape to form the legs 16 and cross member 18. The torsion spring 170 is slid onto one of the legs 16 and positioned on the cross member 18 adjacent the appropriate leg 16. The ratchet mechanism 108 is assembled by positioning the pawl member 110 between the side walls 118 of the support arm 112 and then passing the pivot pin 114 (small head 142 first) through aperture 132, passageway 146 and aperture 134 whereupon the small head 142 engages the support arm 112 with a snap-lock connection to retain the pawl 110 and pivot pin 114 pivotally on the support arm 112. The extension spring 116 is attached to the pivot pin 114 and support arm 112 in the aforementioned manner and the support arm 112 slid on to the flattened region 22 of the cross member 18 to establish the proper angular orientation between the support arm 112 and mounting post legs 16. The positioned support arm 112 is welded or otherwise attached to the cross member 18. The legs 16 of the mounting post 14 are then passed through the slots 48 of the lower body section 32 and the cross member 18 forced into snap-lock engagement with the lower saddles 96 so as to be retained within the sockets 102. The headrest cushion 86 is attached to the upper shell section 30 and the upper section 30 forced bodily into snap-locking engagement with the lower section 32 via the snap-couplings 50, 52. The couplings 50, 52 maintain the saddles 94, 96 engaged pivotally with the cross member 18 to enable the body sections 30, 32 to pivot together relative to the mounting post 14.

As indicated in FIG. 7, a starting position (solid lines) is established by the headrest body 12 being disposed in a rearward-most position with the rack engaging portion 160 of the pawl 110 disposed in front of the first forward-most tooth of the rack 106. The headrest body 12 is tilted forwardly in the direction of arrow F by bodily grasping the headrest body and rotating the body 12 so that the pawl 110 ratchets between adjacent teeth of the rack 106. The extension spring 116 extends along one side of the pivot axis A and biases the pawl 110 to the upright position and the torsion spring 170 acts to maintain the locking surface 166 of the pawl forced against the locking surface 168 of the associated tooth to maintain the angularly adjusted position of the headrest body 12.

The headrest body 12 is returned to the starting position (solid line of FIG. 7) by tilting the headrest body 12 completely forwardly so that the camming surface 162 of the pawl 110 engages a rearward disengaging projection 176 formed as a continuous extension of the tooth pattern 106 and also integrally formed with the upper body section 30. The disengaging projection 176 causes the pawl 110 to automatically rotate counter clockwise, as viewed in FIG. 7, about the pivot axis A of pivot pin 114 so that the line of force of extension spring 116 is over-center of the pivot axis A (i.e., the spring extends along the opposite side of the pivot pin axis A), thereby causing the extension spring 116 to urge and maintain the pawl 110 in a knocked-over inoperative position, shown in phantom in FIG. 7. In this position, the pawl 110 is completely disengaged from the ratchet 106 so that the headrest body 12 may be rotated rearwardly in the direction R toward the starting position shown in solid in FIG. 7 without the pawl 110 engaging the teeth 106. Upon reaching the rearward most tilted position, the tip of the pawl 110 engages the inside of the front wall 40 forcing the pawl 110 to rotate clockwise and further causing the extension spring 116 to rotate back over-center of the pivot axis A to urge the pawl 110 into the upstanding operational position.

The body sections 30, 32, pawl member 110, and pivot pin 114 are preferably fabricated from organic polymeric plastic materials.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than is specifically described.

What is claimed is:

1. A tilt adjustable headrest assembly, comprising:
mounting post means (14);
a headrest body (12) having a first body section (30) and a second body section (32);
pivot connection means (92) formed integrally with said body sections (30, 32) for pivotally connecting said body sections (30, 32) to said mounting post means (14) enabling said headrest body (12) to pivot relative to said mounting post means (14);
and characterized by said body sections (30, 32) having a self-locking snap-together coupling means (34) formed as integral portions of said first and second body sections (30, 32) for automatically locking said first body section (30) into retaining engagement with said second body section (32) and securing said pivot connection means (92) to said mounting post means (14) to connect said headrest body (12) pivotally to said mounting post means (14) upon application of a compressive assembly force to said body sections (30, 32).

2. An assembly as set forth in claim 1 further characterized by said coupling means (34) comprising mutually engagable male (54, 70) and female (56, 72) members.

3. An assembly as set forth in claim 2 further characterized by said female member (56, 72) comprising a boss formed as an integral portion of said first section (30) and said male member (54, 70) comprising a flexible spring finger (58, 74) formed as an integral portion of said second section (32) and having an enlarged locking head (60, 76), said boss (56, 72) having a channel (66, 82) for insertably receiving and deflecting said finger (58, 74) and a locking portion (68, 84) adjacent said channel (66, 82) for lockably engaging said enlarged head (60, 76) of said finger (58, 74) to join said first and second sections (30, 32) together.

4. An assembly as set forth in claim 3 further characterized by said enlarged head (60, 76) of said finger (58, 74) having a camming surface (62, 78) for engaging said channel (66, 82) upon inserting said finger (58, 74) therein and causing said finger (58, 74) to deflect enabling said head (60, 76) of said finger (58, 74) to pass through said channel (66, 82) and lockably engage said locking portion (68, 84) of said boss (56, 72).

5. An assembly as set forth in claim 1 further characterized by said first and second sections (30, 32) defining a cavity (28) therebetween for housing said pivot connection means (92), said coupling means (34) being disposed externally of said cavity (28).

6. An assembly as set forth in claim 1 further characterized by first and second sections (30, 32) being fabricated of organic polymeric material.

* * * * *